(12) United States Patent
Vidmar et al.

(10) Patent No.: US 7,869,951 B1
(45) Date of Patent: Jan. 11, 2011

(54) METHOD OF DETERMINING LOCAL ELECTROMAGNETIC SENSOR REFRACTIVITY

(75) Inventors: Anthony Vidmar, Wyndmoor, PA (US); Daniel P. Bergen, II, Maple Shade, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 254 days.

(21) Appl. No.: 12/171,639

(22) Filed: Jul. 11, 2008

(51) Int. Cl.
*G01V 3/00* (2006.01)
(52) U.S. Cl. ........................................... 702/2
(58) Field of Classification Search ............ 702/2, 702/5, 16, 80, 143, 150–155; 701/213
See application file for complete search history.

(56) References Cited

U.S. PATENT DOCUMENTS

| | | | |
|---|---|---|---|
| 3,069,677 A | 12/1962 | Bruck | |
| 7,248,206 B1 | 7/2007 | Boka et al. | |
| 2007/0027624 A1* | 2/2007 | Powe et al. | 701/213 |

* cited by examiner

*Primary Examiner*—Mohamed Charioui
(74) *Attorney, Agent, or Firm*—Duane Morris LLP (57) ABSTRACT

Local ES refractivity for a geographical position on a given date is determined by locating the geographical position within one of the Delaunay triangles in a grid of Delaunay triangles defined by a plurality of data points in a database containing temporal (e.g. monthly) average refractivity values at various locations around the globe. Each of the data points in the database form the vertices of the Delaunay triangles and by interpolating the temporal averaged refractivity of the vertices of the triangle enclosing the geographical position to the given date and then interpolating the refractivity of the vertices to the geographical position within the triangle, the local ES refractivity of the geographical position is estimated.

6 Claims, 10 Drawing Sheets

METHOD OF DETERMINING LOCAL ELECTROMAGNETIC SENSOR REFRACTIVITY

STATEMENT OF GOVERNMENTAL INTEREST

This invention was made with Government support under Contract N00024-03-C-6110. The United States Government has certain rights in this invention.

CROSS-REFERENCE TO RELATED APPLICATION

None

FIELD OF THE INVENTION

This disclosure relates to electromagnetic sensor (ES) applications and in particular to automatic determination of local ES refractivity.

BACKGROUND

Accurate ES readings require consideration of the refraction of the ES signal through the atmosphere and compensating for it. In addition, because the refractivity in atmosphere is not constant throughout the globe, the ES refractivity of the locale where the ES is located must be determined and accounted for. However, because measuring ES refractivity requires additional sensors configured to estimate the refractivity, it is not a practical solution for a mobile ES system to measure the local ES refractivity every time the mobile ES is relocated.

SUMMARY

According to an embodiment of the disclosure, a method of determining local ES refractivity for a given geographical position on a given date comprises providing a refractivity database containing a plurality of data points, each data point representing temporal (e.g monthly, daily, etc.) average refractivity values at various locations around the globe. Next, a Delaunay triangulation is performed on the plurality of data points in the refractivity database so that the globe is defined into a 2-dimensional grid of triangles wherein each of the data points in the database forms a vertex of the triangles in the grid. To determine the local ES refractivity at the given geographical position, the vertices of a particular triangle in the grid that encloses the geographical position is determined. Then, the monthly average refractivity value at the vertices of the triangle enclosing the geographical position is interpolated to the given date. Lastly, the local ES refractivity at the geographical position within the triangle is interpolated from the refractivity values of the vertices. The method described herein determines the local ES refractivity through approximation by modeling the spherical globe into a 2-dimensional model.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

All drawings are schematic and are not intended to show any dimensions to scale.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Figure 1:
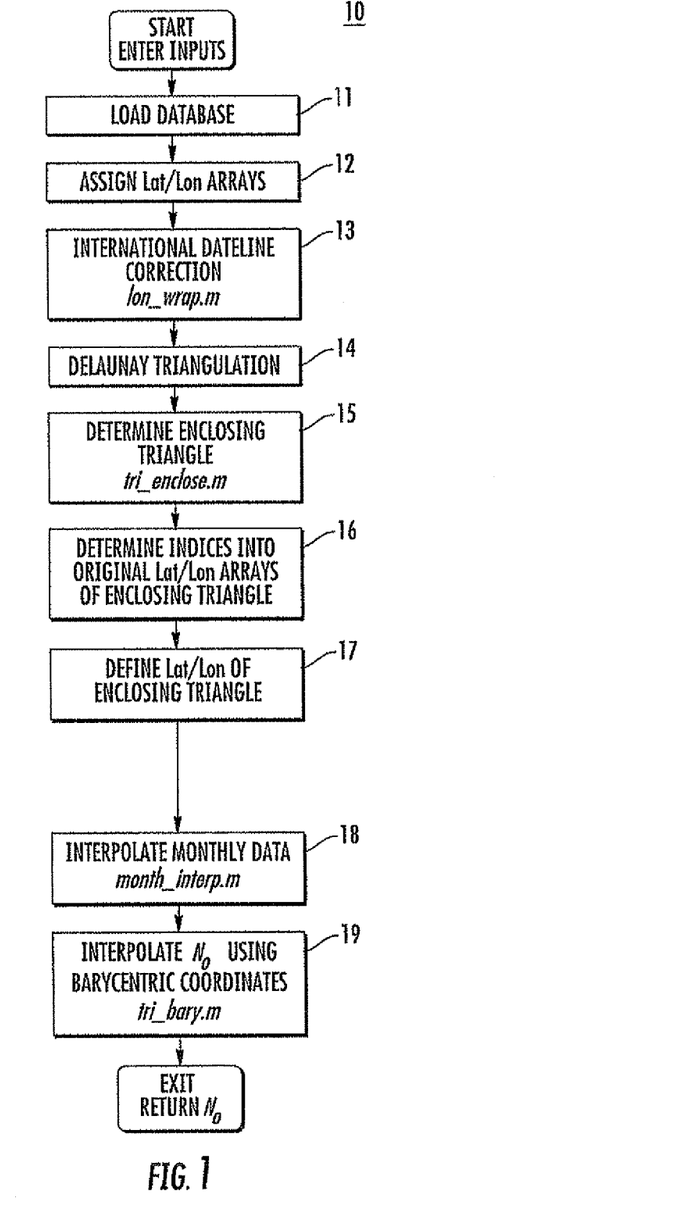
FIG. 1 is a flowchart outlining the method of the present disclosure.

FIG. 1 shows a flowchart 10 outlining the method of determining local refractivity according to an aspect of the present disclosure. The method enables an ES system to automatically and quickly determine the local refractivity so that the ES system can be calibrated to compensate for the refractivity in the locale where the ES system is located.

Figure 2:
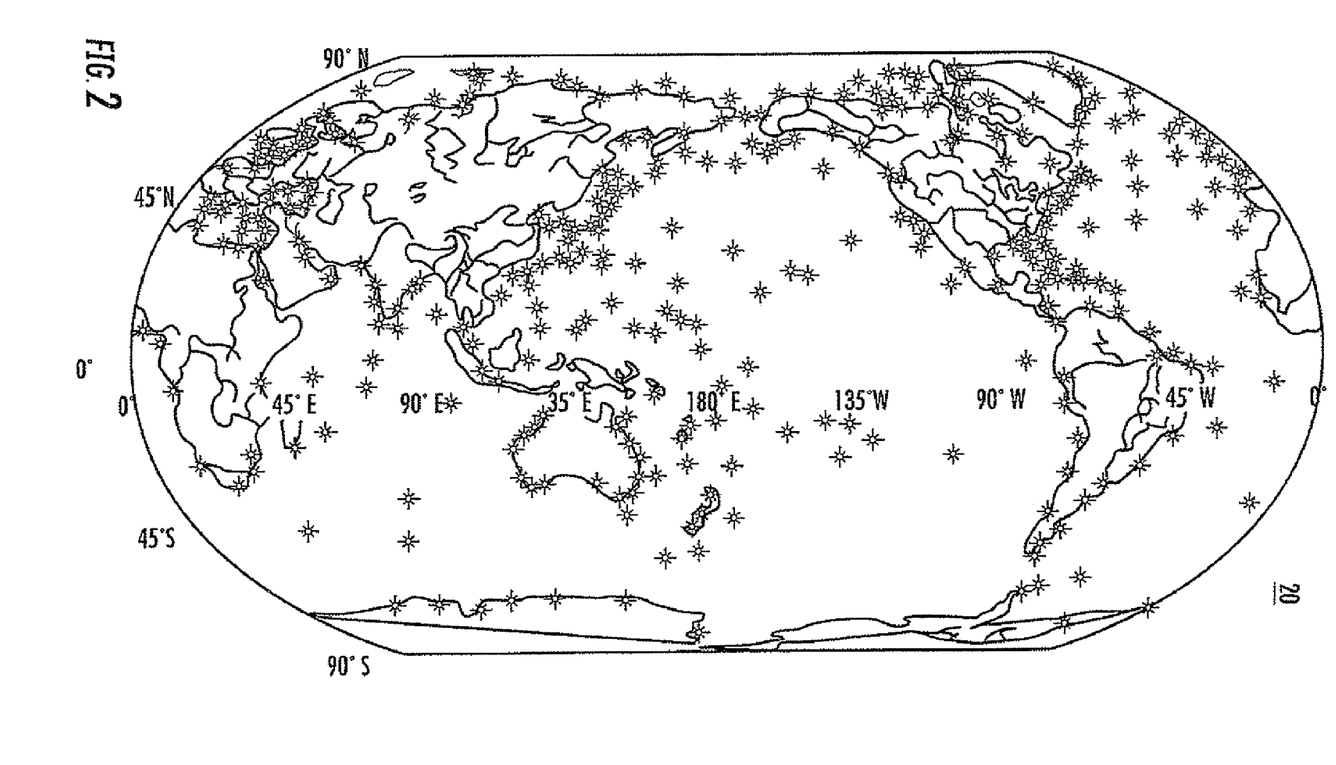
FIG. 2 is an Eckert IV projection global map illustrating an example of a plurality of data points representing a monthly average refractivity at various coastal and oceanic points around the globe.

First, a historical refractivity database containing suitably temporally averaged (e.g. monthly) refractivity values at various locations around the globe is loaded or provided to the ES system (see block 11). In the database, each of the various locations are identified by the longitude and latitude for that location. The database can be stored in the ES system's memory unit and can be updated as new data permits or as desired. When the database is first loaded in to the ES system, the latitude and longitude are assigned to arrays x and y, respectively (see block 12). The arrays of spherical latitude/longitude coordinates in one embodiment are treated as planar coordinates, as in a Mercator projection map. FIG. 2 is a graphical illustration of the data points, each pair of entry in the arrays x and y, in the database overlaid on an Eckert IV projection global map 20. Each of the points marked by "*" represents the latitude/longitude coordinate pairs marking the location where the temporal average refractivity are provided in the database. The illustration of FIG. 2 shows the coastal and oceanic points for illustrative purposes only but the historical refractivity database can contain inland data points also if necessary.

Figure 6:
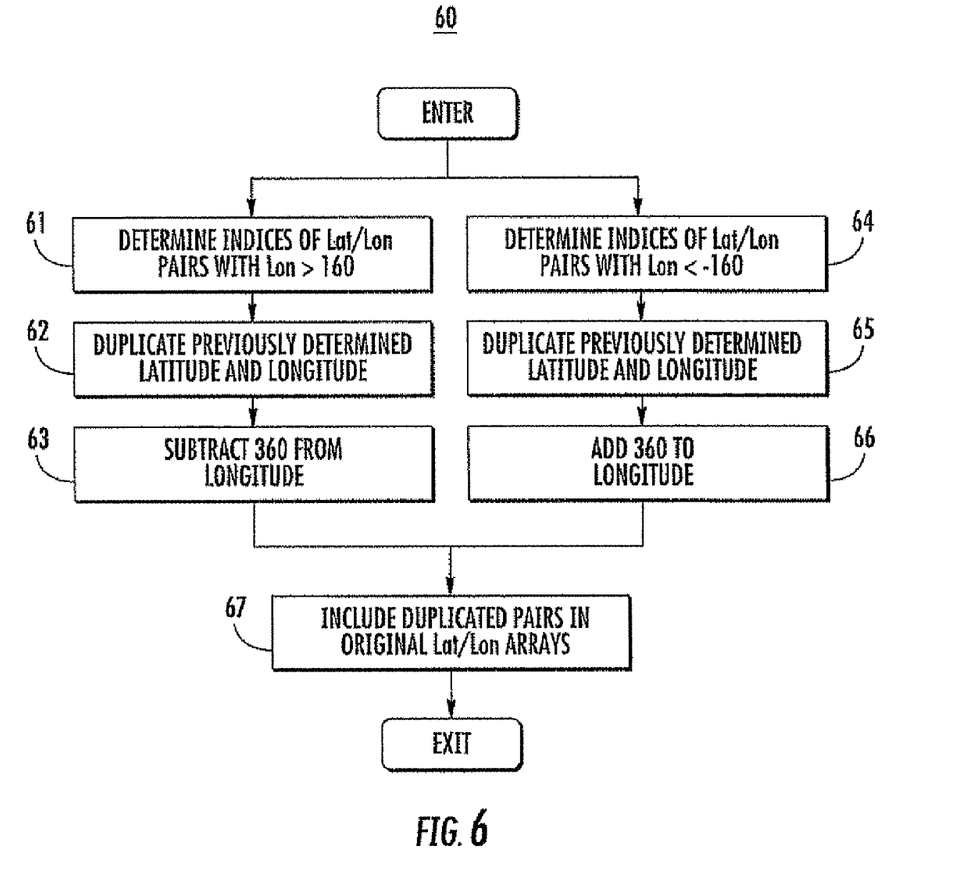
FIG. 6 is a flowchart outlining the process of handling the spherical earth with the 2-dimensional Delaunay triangulation across the international dateline according to an aspect of the present disclosure.

In this case of 2D approximation of the spherical earth, where the temporal average refractivity database includes data points that straddles or covers regions around the international dateline, a correction is made to the arrays x and y to allow for the international dateline (see block 13). The discontinuity of the 2D representation at the international dateline (or any other chosen longitude) is treated by duplicating, say for example, depending on the granularity of the database, 20° eastward and 20° westward of the dateline to extend the 2D map. The function [lon_wrap.m] takes care of the discontinuity caused by points on or near +/−180 degrees longitude. FIG. 6 is a flowchart diagram of the function [lon_wrap.m]. The input of the function are the longitude and latitude arrays, x and y. [lon_wrap.m] first determines the indices of points near the international dateline which need to be duplicated. This is accomplished by finding the indices of all the latitude/longitude pairs whose longitude is greater than 160 degrees (see block 61) and those whose longitude is less than −160 degrees (see block 64), and assigning them to the temporary variables or indices POS and NEG, respectively.

$$POS=\text{find}(x>160) \tag{1}$$

$$NEG=\text{find}(x<-160) \tag{2}$$

The function then defines the latitude and longitude of the indices determined above to $x_{POS}$, $y_{POS}$, $x_{NEG}$ and $y_{NEG}$, for the POS and NEG indices respectively.

$$x_{POS}=x(POS) \tag{3}$$

$$y_{POS}=y(POS) \tag{4}$$

$$x_{NEG}=x(NEG) \tag{5}$$

$$y_{NEG}=y(NEG) \tag{6}$$

The rows containing the aforementioned latitude/longitude pairs are duplicated in order to be appended to the end of the database making the database larger. In order to properly "wrap" the points around the international dateline, 360 degrees is then subtracted from $x_{POS}$ (see block 63) and added to $x_{NEG}$ (see block 66).

$$x_{POS}=x_{POS}-360 \tag{7}$$

$$x_{NEG}=x_{NEG}+360 \tag{8}$$

The newly defined longitude/latitude pairs are then added to the existing x and y arrays, and returned to the main algorithm (see block 67).

$$x = \begin{bmatrix} x \\ x_{POS} \\ x_{NEG} \end{bmatrix} \tag{9}$$

$$y = \begin{bmatrix} y \\ y_{POS} \\ y_{NEG} \end{bmatrix} \tag{10}$$

The database is also updated at this point to reflect the new longitude/latitude pairs.

Then the area covered by the historical refractivity database in the global map 20 is divided into a grid of triangles by performing a Delaunay triangulation (see block 14 of FIG. 1). The Delaunay triangulation returns a set of triangles, each triangle formed by natural neighbor latitude/longitude points in the x, y array and forming the vertices of the triangle such that no other latitude/longitude points are contained within any of the triangles. This is graphically illustrated in the grid map 30 of FIG. 3. The grid map 30 is generate by overlaying the triangles on a Mercator projection of a global map. The array of latitude/longitude indices of the vertices of each of the Delaunay triangle is defined as a matrix $\Lambda$. The matrix $\Lambda$ is n rows by three columns each row containing the three latitude/longitude pairs for each of the three vertices in each triangle.

Figure 3:
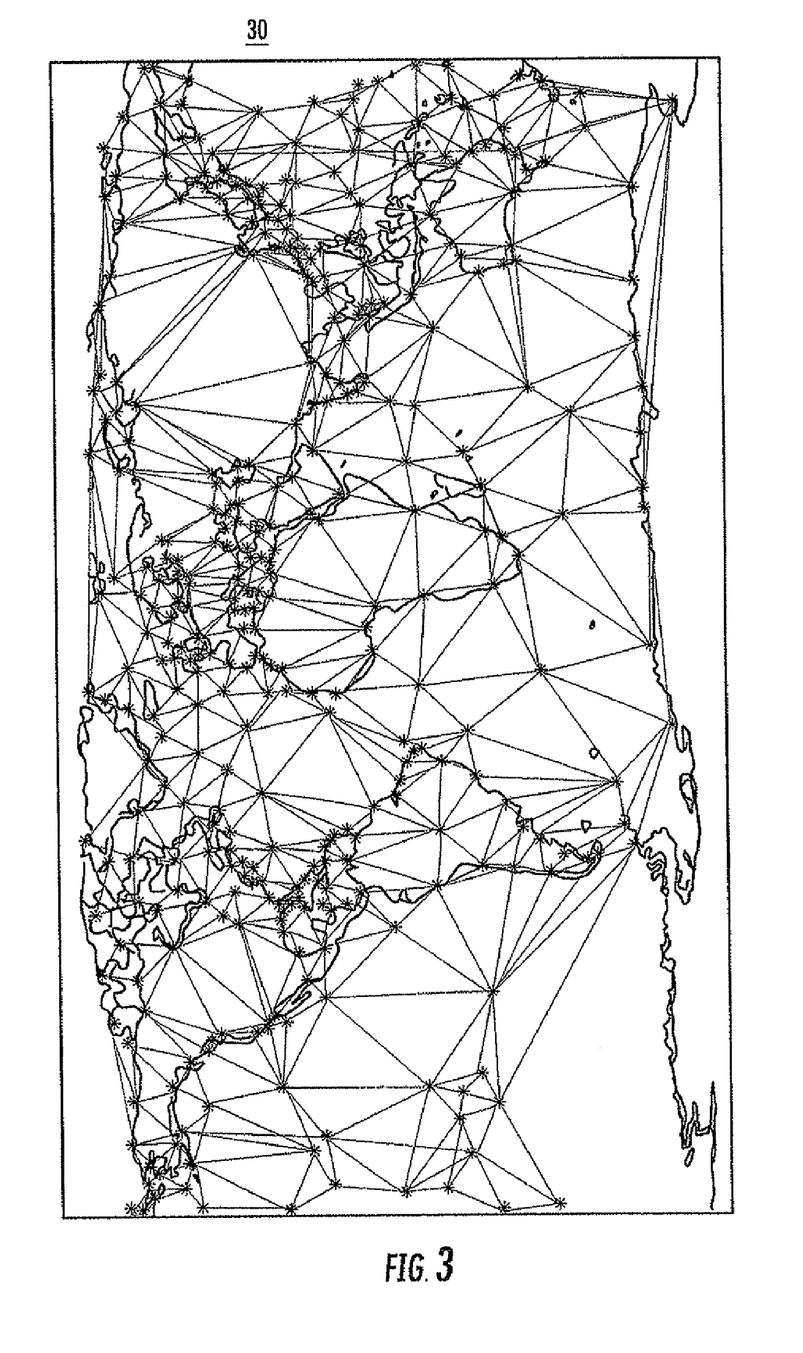
FIG. 3 is a Mercator projection global map showing the Delaunay triangle grid.

Next, a determination is made as to which triangle in the grid map 30 contains or encloses the particular geographical position where the ES sensor is located for which the local refractivity is to be determined (see block 15). This can be accomplished by a function that returns the index, k, into the matrix $\Lambda$ of the enclosing triangle. The indices, j, of the original longitude/latitude arrays of the enclosing Delaunay triangle can then be defined as the $k^{th}$ row of the matrix $\Lambda$ (see block 16).

$$j=\Lambda(k,:) \tag{11}$$

The three pairs of longitude and latitude coordinates of the enclosing triangle, $x_{ENC}$, and $y_{ENC}$, respectively, can then be defined as $$x_{ENC}=x(j) \tag{12}$$

$$y_{ENC}=y(j) \tag{13}$$

where x(j) and y(j) are the values of the x and y arrays at indices j.

Figure 7:
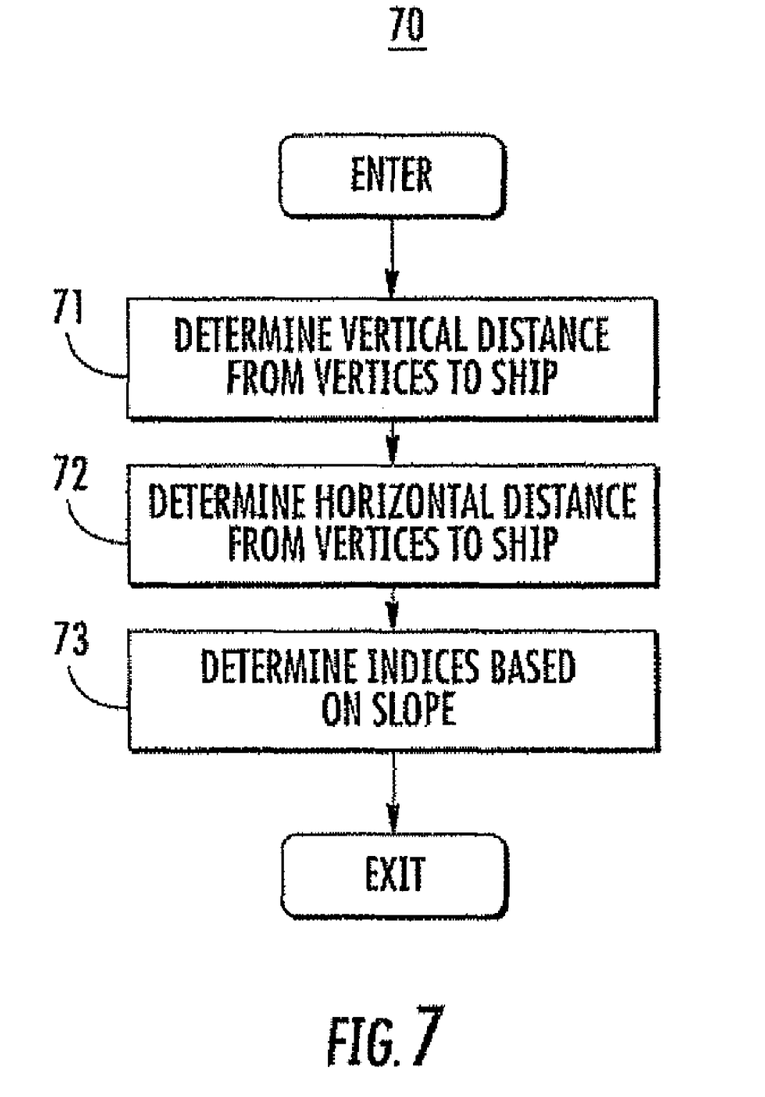
FIG. 7 is a flowchart outlining the process of determining which of the Delaunay triangles enclose a particular geographical position according to an aspect of the present disclosure.

FIG. 7 is a flowchart diagram of the logical flow of process in determining the enclosing triangle. For purposes of this discussion and as an example of an application, it is assumed that an ES sensor is provided on a ship that is located at the geographical position and that the local refractivity at the ship's location is desired. The process takes the x and y arrays as well as the longitude and latitude of the ship's location denoted as Lon$_{SHIP}$ and Lat$_{SHIP}$ respectively.

Next, the x and y coordinate differences of the ES location with each of the candidate enclosing triangle vertices are generated. This allows the formation of lines 46, 47, 48 (see FIG. 8) defining the slopes from the vertices to the ES location. By comparing the slopes of these segments, containments in one triangle can be determined. Due to the possibility of a vertical segment with infinite slope and to avoid division for computation speed, the slopes are not explicitly formed, their cross products are used.

Figure 8:
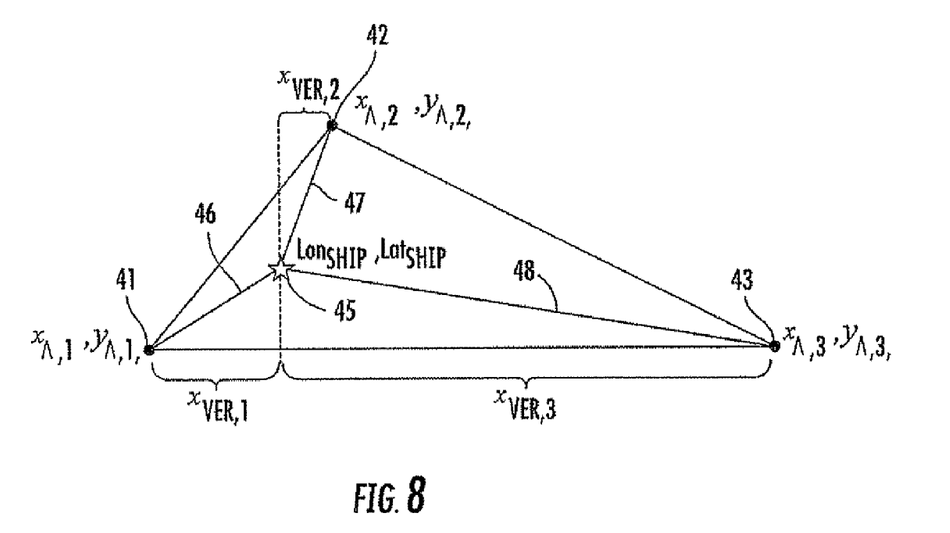
FIG. 8 is a schematic illustration of a Delaunay triangle illustrating an aspect of the method of the flowchart of FIG. 7.

Three arrays (whose size is number of data points in the database-by-1), $x_{VER,i}$ (i=1, 2, 3), are created consisting of the distance between the longitude of the $i^{th}$ of each triangle and the longitude of the ship's location (see block 71) of flow diagram 70 of FIG. 7. $x_{VER,i}$ can be shown as $$x_{VER,1} = x_{A,1} - \text{Lon}_{SHIP} \tag{14}$$

$$x_{VER,2} = x_{A,2} - \text{Lon}_{SHIP} \tag{15}$$

$$x_{VER,3} = x_{A,3} - \text{Lon}_{SHIP} \tag{16}$$

Where $x_{A,i}$ is the array composed of the longitudes of the $i^{th}$ vertex of all the triangles returned by the triangulation. This can best be illustrated graphically as shown in FIG. 8.

The method then repeats this step for the latitude (see block 72). In other words, the horizontal distances $y_{VER,1}$, $y_{VER,2}$ and $y_{VER,3}$ from the vertices of the triangle 40 to the ship's location 45 are determined.

$$y_{VER,1} = y_{A,1} - \text{Lat}_{SHIP} \tag{17}$$

$$y_{VER,2} = y_{A,2} - \text{Lat}_{SHIP} \tag{18}$$

$$y_{VER,3} = y_{A,3} - \text{Lat}_{SHIP} \tag{19}$$

The algorithm next performs the following logical inequality based on slopes to solve for the array Π (see block 73).

$$\Pi = (x_{VER,1} \cdot * y_{VER,2} > x_{VER,2} \cdot * y_{VER,1}) + \tag{20}$$
$$(x_{VER,2} \cdot * y_{VER,3} > x_{VER,3} \cdot * y_{VER,2}) \ldots +$$
$$(x_{VER,3} \cdot * y_{VER,1} > x_{VER,1} \cdot * y_{VER,3})$$

Each inequality returns a value of 1 for true and 0 for false, creating an array, Π, of values 0, 1, 2 and 3. The index, k, of the enclosing triangle in Λ is then defined as the first occurrence of a 3 or a 0 value in Π as denoted by $$k = \min(\text{find}(\Pi==3|\Pi==0)) \tag{21}$$

Figure 4:
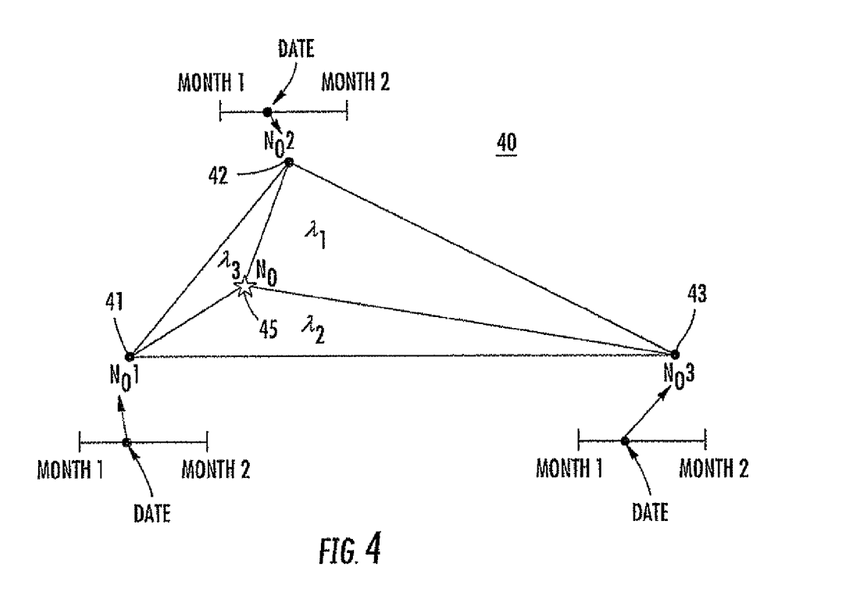
FIGS. 4 and 5 are schematic illustrations of a Delaunay triangle illustrating the interpolation of the monthly average refractivity at the vertices of the triangle to a particular date and then subsequent interpolation of the refractivity at the vertices to a geographical position located within the triangle.

Then, the monthly average refractivity value at the vertices of the triangle enclosing the geographical position are interpolated to the given Date (see block 18). This is graphically depicted in FIG. 4. The triangle 40 defined by the vertices 41, 42 and 43 encloses the geographical position 45. The interpolated local refractivity values at each of the vertices 41, 42 and 43 are noted as $N_0 1$, $N_0 2$ and $N_0 3$, respectively. The local refractivity values $N_0 1$, $N_0 2$ and $N_0 3$ are interpolated to the given Date between the two monthly average values for "Month 1" and "Month 2."

Figure 9:
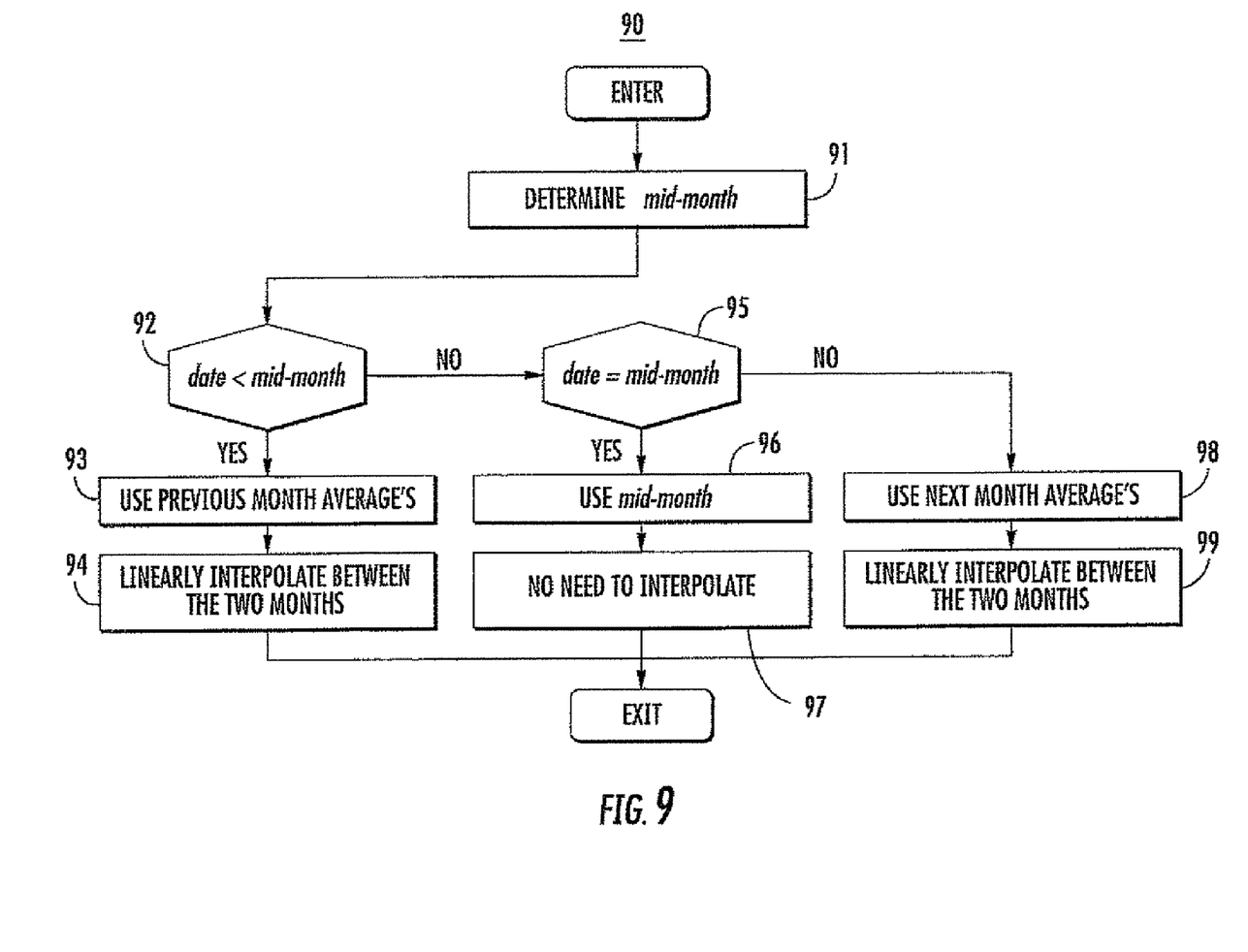
FIG. 9 is a flowchart outlining the process of interpolating the temporal average refractivity values to a particular given date according to an aspect of the present disclosure.

The flowchart diagram 90 of FIG. 9 shows the detailed steps involved in the interpolation of the monthly average refractivity value at the vertices to the given date. For a given Date, the mid-month day of the current month is determined by taking the total number of days in the month, and dividing by two (see block 91). If the total number of days in the month is odd, thereby, leaving a remainder when dividing by two, the value of the mid-month day is rounded down to the nearest integer. The secondary month to be used in the interpolation is then determined. If the value of the given Date is less than the value of the mid-month day (see block 92), the previous month average is to be used (see block 93). Then, the value for the given Date is linearly interpolated between the two months.

If the value of the given Date is equal to that of the mid-month day (see block 95), no interpolation is needed and the refractivity value for the current month is used (see blockes 96 and 97). If the value of the given Date is greater than the value of the mid-month day, the next month average refractivity value is used (see block 98). Then, the refractivity for the given Date at the current vertex is linearly interpolated between the current month and the secondary month (see block 99).

Figure 5:
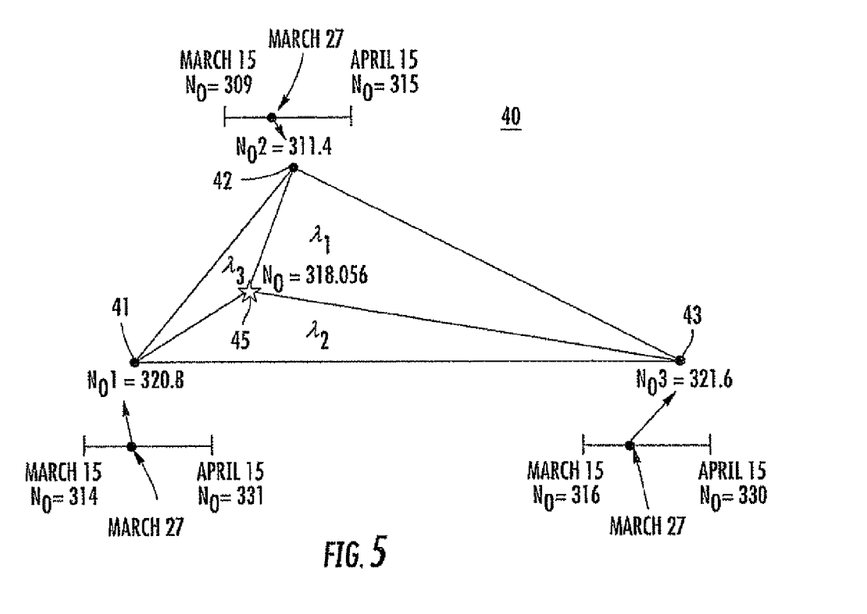

Finally, the local refractivity $N_0$ at the geographical position 45 located within the triangle 40 is interpolated using Barycentric coordinates of the geographical position 45 (see block 19). FIG. 5 shows the example of FIG. 4 with a randomly chosen example date of March 27 as the given "Date" for which the local refractivity $N_0$ at the geographical position 45 is desired. For example, the historical monthly average local refractivity for the vertex 41 is 314 for March and 331 for April. Since the historical data is monthly average values, for the purposes of interpolation, each monthly average is assigned to the 15$^{th}$ of the month. Thus, the refractivity for the given Date March 27 is interpolated between the dates March 15 (314) and April 15 (331) and the results in the value 320.8 as the interpolated local refractivity at vertex 41. Similar interpolation is carried out for the vertices 42 and 43. The interpolation of the local refractivity $N_0$ at the geographical position 45 results in the value of 318.056.

Figure 10:
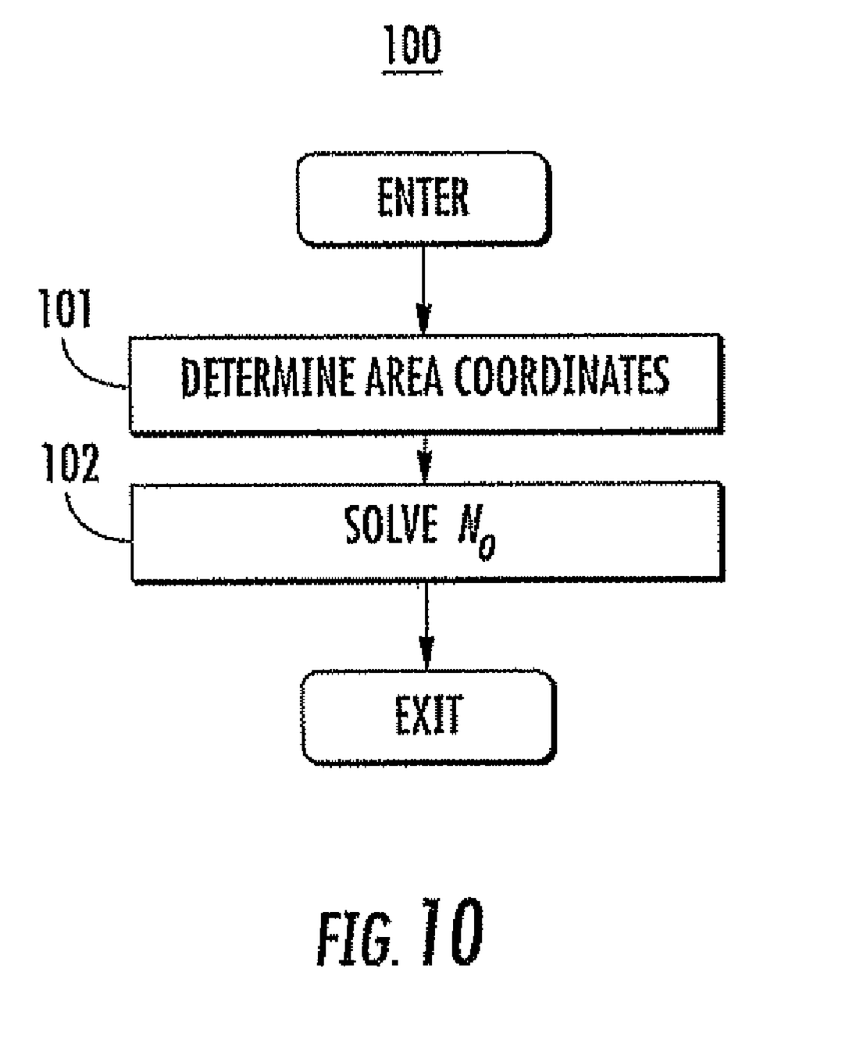
FIG. 10 is a flowchart outlining the process of interpolating the refractivity values of the vertices of a Delaunay triangle to a given point within the triangle using Barycentric coordinates.
Figure 11:
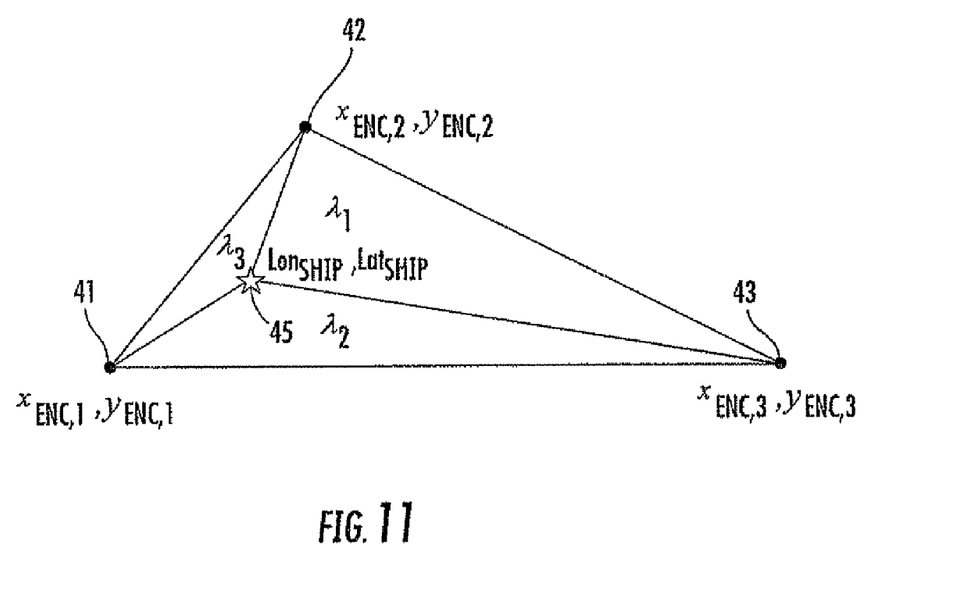
FIG. 11 is a schematic illustration of a Delaunay triangle illustrating an aspect of the process outlined in FIG. 10.

FIG. 10 is a flowchart diagram 100 showing the linear interpolation process using Barycentric coordinates of the ship located at the geographical position 45. This linear interpolation operates on the $\text{Lon}_{SHIP}$, $\text{Lat}_{SHIP}$, $x_{ENC}$, $y_{ENC}$, and $z$, where $z$ is refractivity array. The governing equations must first be introduced:

$$\lambda_1 x_{ENC,1} + \lambda_2 x_{ENC,2} + \lambda_3 x_{ENC,3} = \text{Lon}_{SHIP} \tag{22}$$

$$\lambda_1 y_{ENC,1} + \lambda_2 y_{ENC,2} + \lambda_3 y_{ENC,3} = \text{Lat}_{SHIP} \tag{23}$$

$$\lambda_1 + \lambda_2 + \lambda_3 = 1 \tag{24}$$

$$N_0 = \sum_i \lambda_i z_i = \lambda_1 z_1 + \lambda_2 z_2 + \lambda_3 z_3 \tag{25}$$

Where λ are the area coordinates as shown in FIG. 11. The area coordinates, λ, are determined by solving the following system of equations (see block 101 of flowchart 100)

$$A\lambda = B \tag{26}$$

Where $$A = \begin{bmatrix} x_{ENC,1} & x_{ENC,2} & x_{ENC,3} \\ y_{ENC,1} & y_{ENC,2} & y_{ENC,3} \\ 1 & 1 & 1 \end{bmatrix} \tag{27}$$

$$B = \begin{bmatrix} \text{Lon}_{SHIP} \\ \text{Lat}_{SHIP} \\ 1 \end{bmatrix} \tag{28}$$

Solving the above system of equations leads to $$\lambda_1 \frac{y_{ENC,2} * \text{Lon}_{SHIP} - y_{ENC,3} * \text{Lon}_{SHIP} - x_{ENC,2} * \text{Lat}_{SHIP} + x_{ENC,2} * y_{ENC,3} + x_{ENC,3} * \text{Lat}_{SHIP} - x_{ENC,3} * y_{ENC,2}}{x_{ENC,1} * y_{ENC,2} - x_{ENC,1} * y_{ENC,3} - x_{ENC,2} * y_{ENC,1} + x_{ENC,2} * y_{ENC,3} + x_{ENC,3} * y_{ENC,1} - x_{ENC,3} * y_{ENC,2}} \tag{29}$$

$$\lambda_2 \frac{x_{ENC,1} * \text{Lat}_{SHIP} - x_{ENC,1} * y_{ENC,3} - y_{ENC,1} * \text{Lon}_{SHIP} + y_{ENC,3} * \text{Lon}_{SHIP} + x_{ENC,3} * y_{ENC,1} - x_{ENC,3} * \text{Lat}_{SHIP}}{x_{ENC,1} * y_{ENC,2} - x_{ENC,1} * y_{ENC,3} - x_{ENC,2} * y_{ENC,1} + x_{ENC,2} * y_{ENC,3} + x_{ENC,3} * y_{ENC,1} - x_{ENC,3} * y_{ENC,2}} \tag{30}$$

-continued $$\lambda_3 \frac{\begin{array}{l}x_{ENC,1}*y_{ENC,2} - x_{ENC,1}*Lat_{SHIP} - x_{ENC,2}*y_{ENC,1} + \\ x_{ENC,2}*Lat_{SHIP} + y_{ENC,1}*Lon_{SHIP} - y_{ENC,2}*Lon_{SHIP}\end{array}}{\begin{array}{l}x_{ENC,1}*y_{ENC,2} - x_{ENC,1}*y_{ENC,3} - x_{ENC,2}*y_{ENC,1} + \\ x_{ENC,2}*y_{ENC,3} + x_{ENC,3}*y_{ENC,1} - x_{ENC,3}*y_{ENC,2}\end{array}} \qquad (31)$$

After the area coordinates are determined by above system of equations, the local refractivity $N_0$ at the ship's position 45 can then be solved (see block 102 of flowchart 100). The local refractivity $N_0$ of the ship located at position 45 is solved by substituting the values of $\lambda$ into the equation (25).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An electromagnetic sensor system comprising a memory unit, wherein the memory unit being encoded with a computer program code such that when the computer program code is executed by the electromagnetic sensor system, the system performs a method for determining local electromagnetic sensor refractivity for a geographical position on a given date, the method comprising:

providing a refractivity database containing a plurality of data points in the memory unit, each data point representing temporal averaged refractivity values at various locations around the globe;

defining a grid of triangles wherein each of the data points form a vertex of said triangles;

identifying the vertices of a triangle in the grid that encloses said geographical position;

interpolating the temporal average refractivity value at the vertices of said triangle enclosing said geographical position to said given date; and interpolating the local refractivity at said geographical position within the triangle using Barycentric coordinates of the geographical position.

2. The system of claim 1, wherein defining the grid of triangles involves performing Delaunay triangulation.

3. The system of claim 1, where the refractivity database encompass data points straddling international dateline, further comprising correcting the refractivity database for the international dateline before the grid of triangles are defined.

4. The system of claim 1, wherein temporal averaged refractivity is monthly averaged refractivity.

5. The system of claim 1, wherein temporal averaged refractivity is daily averaged refractivity.

6. The system of claim 1, wherein temporal averaged refractivity is hourly averaged refractivity.

* * * * *